тут

2,893,983

COPOLYMERS OF DICHLOROHEXAFLUOROBUTENE

Elizabeth S. Lo, Elizabeth, N.J., assignor, by mesne assignments, to Minnesota Mining and Manufacturing Company, St. Paul, Minn., a corporation of Delaware No Drawing. Application April 23, 1956
Serial No. 579,710

19 Claims. (Cl. 260—87.5)

This invention relates to, and has for its object, the preparation of new and useful copolymers of dichlorohexafluorobutene. More particularly, the invention relates to, and has for its object, the preparation of thermoplastic copolymers of dichlorohexafluorobutene, having a wide variety of commercial uses and applications. Still more particularly, the invention relates to, and has for its object, a method for the preparation of these copolymers. Other objects and advantages inherent in the invention will become apparent to those skilled in the art from the accompanying description and disclosure.

In accordance with the present invention, dichlorohexafluorobutene is copolymerized with a monochloroethylene having not more than 1 fluorine atom as the only other halogen substituent, to produce new and useful copolymeric compositions. In this respect, it is found that these copolymeric compositions possess increased tensile strength, increase resistance to oil and hydrocarbon fuels, improved flow-properties, and improved chemical and physical stability over any of the aforementioned comonomers alone, when employed in the form of their corresponding homopolymers. These copolymeric compositions of dichlorohexafluorobutene and the aforementioned monochloroethylene, constitute valuable macromolecules and are adaptable to a wide variety of commercial uses. They possess low temperature flexibility, in addition to the aforementioned properties of chemical and physical stability and resistance to oil and hydrocarbon fuels. They are also selectively soluble in various commercial solvents and serve as durable, flexible, protective coatings on surfaces which are subjected to environmental conditions in which they may come into contact with any of the aforementioned corrosive substances.

In general, as more fully hereinafter disclosed, the copolymeric compositions of the present invention are produced from the polymers of monomeric mixtures containing dichlorohexafluorobutene (e.g., 4,4-dichlorohexafluorobutene-1 or 2,3-dichlorohexafluorobutene-2) and the monochloroethylene having not more than 1 fluorine atom as the only other halogen substituent, as a comonomer, (e.g., 1,1-chlorofluoroethylene or vinyl chloride) at temperatures between about −20° C. and about 150° C., with intermediate temperature ranges being selected with references to the specific copolymer system employed. The most useful thermoplastic copolymeric compositions of the present invention are copolymers produced from monomeric mixtures containing between about 5 mole percent and 90 mole percent of the dichlorohexafluorobutene and the remaining major constituent being either 1,1-chlorofluoroethylene or vinyl chloride. The preferred copolymeric compositions of the present invention are copolymers produced from monomeric mixtures containing between about 10 mole percent and about 60 mole percent of the dichlorohexafluorobutene and the remaining major constituent being either 1,1-chlorofluoroethylene or vinyl chloride.

In producing copolymeric compositions from the aforementioned monomeric mixtures containing between about 5 mole percent and about 90 mole percent of the dichlorohexafluorobutene and the remaining major constituent being either of the aforementioned comonomers, it is found that the finished copolymeric product contains between about 1 mole percent and about 50 mole percent of the dichlorohexafluorobutene and the remaining major constituent being either 1,1-chlorofluoroethylene or vinyl chloride. In producing copolymeric compositions from the aforementioned monomeric mixtures containing between about 10 mole percent and about 60 mole percent of the dichlorohexafluorobutene and the remaining major constituent being either of the aforementioned comonomers, it is found that the finished copolymeric product contains between about 5 mole percent and about 30 mole percent of the dichlorohexafluorobutene and the remaining major constituent being either 1,1-chlorofluoroethylene or vinyl chloride.

The copolymeric compositions of the present invention are preferably prepared by carrying out the polymerization reaction in the presence of a free radical-forming promoter. For this purpose, the polymerization reaction is carried out by employing a water-soluble peroxy type initiator in a water-suspension type recipe or an organic peroxide initiator in a bulk-type system. The water-suspension type recipe is preferred.

The water-suspension type system contains a water-soluble peroxy-type initiator, which is preferably present in the form of an inorganic persulfate such as potassium persulfate, sodium persulfate or ammonium persulfate. In addition, the water-suspension type recipe system may also contain, in some instances, a variable-valence metal salt, for example, an iron salt such as ferrous sulfate or ferrous nitrate to accelerate the copolymerization reaction. The water-soluble initiator present in the water-suspension type recipe system comprises between about 0.1 and about 5 parts by weight per 100 parts of total monomers present. The variable-valence metal salt is preferably employed in an amount between about 0.01 and about 0.2 parts by weight per 100 parts of total monomers present. It is also desirable, in some instances, in these water-suspension type recipe systems, that a reductant be present, preferably in the form of a bisulfite, such as sodium bisulfite, potassium bisulfite, sodium metabisulfite or potassium metabisulfite. The reductant comprises between about 0.05 and about 5 parts by weight per 100 parts of total monomers present; preferably the reductant comprises between about 0.1 and about 2 parts by weight per 100 parts of total monomers present.

In these water-suspension type recipe systems, it is desirable to employ an emulsifying agent. This emulsifying agent is present either in the form of an aliphatic metal acid-salt having from 14 to 20 carbon atoms per molecule, or in the form of a halogenated-organic acid or salts thereof, having from 6 to 18 carbon atoms per molecule. A typical example of the former is potassium stearate. Typical examples of the halogenated-organic acid or salts thereof, serving as emulsifying agents in the above-mentioned water-suspension type recipe systems, are polyfluorocarboxylic acids (e.g., perfluorooctanoic acid) or perfluorochlorocarboxylic acid salts (e.g., trifluorochloroethylene telomer acid soaps). The polyfluorocarboxylic acids which may be employed are such as those disclosed in U.S. Patent No. 2,559,752; and the non-acidic derivatives of the acids disclosed therein as being effective dispersing agents may also be used in the process of the present invention. The perfluorochlorocarboxylic acid salts which may be used in accordance with this invention are those disclosed in co-pending application Serial No. 501,782, filed April 18, 1955, as being useful dispersing agents in polymerization reactions. In general, these emulsifying agents are present in an amount between about 0.5 and about 10 parts by weight per 100 parts of total monomers present.

The polymerization reaction is preferably conducted under neutral conditions, in order to prevent gelling of the resulting polymeric product, a condition which often causes slow-down or stoppage of the polymerization reaction. In this respect, it should be noted that it is sometimes necessary to maintain the pH of the system at a pH of about 7.0 by the addition of suitable buffer agents. Typical examples are sodium borate and disodium phosphate.

As indicated above, the polymerization reaction may also be carried out with the initiator being present in the form of an organic peroxide in a bulk-type polymerization system. Of these organic peroxide promoters, halogen-substituted peroxides are most desirable. A preferred promoter of this type is trichloroacetyl peroxide. Other halogen-substituted organic peroxides for carrying out the polymerization reaction are trifluorodichloropropionyl peroxide, trifluoroacetyl peroxide, difluoroacetyl peroxide, chloroacetyl peroxide, 2,4-dichlorobenzoyl peroxide and dichlorofluoroacetyl peroxide.

As previously indicated, the polymerization reaction is carried out, in general, at a temperature between about −20° C. about 150° C. When the polymerization reaction is carried out employing a water-suspension type recipe, temperatures between about 5° C. and about 100° C. are preferably employed. When the polymerization reaction is carried out in the presence of an organic peroxide initiator in a bulk-type polymerization system, temperatures over the entire range of between about −20° C. and about 150° C. ar preferably employed depending upon the decomposition temperature of the promoter. The polymerization reactions described herein to produce the polymeric compositions of the present invention are carried out under autogenous conditions of pressure. These pressures may vary from about atmospheric pressure to as high as 2000 pounds per square inch. However, in general, these pressures do not rise above approximately 500 pounds per square inch.

As previously indicated, the polymeric compositions of the present invention are particularly suitable and useful when employed in the form of durable, flexible coatings on a wide variety of surfaces, and particularly on surfaces which are subjected to distortion in normal use, such as fabric surfaces. For this purpose, the polymeric composition may be dissolved in various commercial solvents. Particularly useful solvents comprise the aliphatic and aromatic esters, ketones and halogenated hydrocarbons. Typical examples of these solvents are di-isobutyl ketone, methyl ethyl ketone, methyl isobutyl ketone, ethyl acetate and 1,1,2-trifluorotrichloroethane. In this respect, it should be noted that it is often desirable to regulate the molecular weight of the polymeric compositions of the present invention in order to obtain greater solubility in organic solvents. It is found that the addition of various polymerization modifiers appreciably reduces the molecular weight of the polymeric compositions and increases their solubility, without affecting, unduly, the overall yield. Suitable polymerization modifiers include chloroform ($CHCl_3$), Freon–113

($CF_2ClFCl_2$)

carbon tetrachloride ($CCl_4$), trichloroacetyl chloride ($CCl_3COCl$), bromotrichloroethane ($CBrCl_3$), dodecyl mercaptan ($C_{12}H_{25}SH$) and mixed tertiary mercaptans. These modifiers are preferably added in amounts between about 0.01 and about 10 parts by weight per 100 parts of total monomers charged to the polymerization reaction. Chloroform is preferred.

The following examples are offered for a better understanding in producing the thermoplastic copolymeric compositions of the present invention and are not to be construed as limiting its scope.

Example I

A heavy-walled glass polymerization tube of about 20 ml. capacity was flushed with nitrogen and then charged with 10 ml. of a catalyst solution prepared by dissolving 1 gram of potassium persulfate and 0.75 gram of perfluorooctanoic acid in 200 ml. of water, and adjusting this solution to a pH of 7. The 10 ml. of catalyst solution in the polymerization tube was then frozen. The tube was next connected to a gas-transfer system and evacuated at liquid nitrogen temperature. To the frozen contents of the tube were added, by distillation, 2.77 grams of 4,4-dichlorohexafluorobutene-1 and 2.23 grams of 1,1-chlorofluoroethylene, which comprised a 30/70 molar ratio.

The 4,4-dichlorohexafluorobutene-1 monomer is prepared as follows:

Trifluorochloroethylene is telomerized in the presence of sulfuryl chloride, employing benzoyl peroxide as a promoter, at a temperature of approximately 95° C. for a period of 4 hours, to produce the telomer dimer product, $Cl—(CF_2—CFCl)_2—Cl$, 1,2,4,4-tetrachlorohexafluorobutane, having a boiling point of 134° C. and an index of refraction ($n_D^{20}$) of 1.3820. To a 5 ml. round-bottom flask equipped with a magnetic stirrer, a dropping funnel, and a Friedrich condenser (which, in turn, is attached to a bubbler and cold trap maintained at a temperature of −68 C.) there is charged 357 grams (1.17 mol) of the aforementioned 1,2,4,4-tetrachlorohexafluorobutane. The contents of the flask are then heated to 130° C. Thereafter, 105.5 grams (0.63 mol) of triethyl phosphite are added dropwise over a period of 3 hours. The heating is continued for an additional period of 1 hour, after which time the generation of gas has ceased. The cold trap is found to contain only liquefied ethyl chloride (25.6 grams).

The polymerization tube was next sealed under vacuum and agitated in a temperature-regulated water-bath at 50° C. for a period of 24 hours. At the end of this time, the contents of the tube were coagulated by freezing at liquid nitrogen temperature. The coagulated product was then removed from the tube, washed with hot water and then dried to constant weight in vacuo at 35° C. A copolymeric rubbery product was obtained which was found, upon analysis, to comprise 21 mole percent 4,4-dichlorohexafluorobutene-1, and the remaining major constituent, 1,1-chlorofluoroethylene, being present in an amount of 79 mole percent. The copolymer was obtained in an amount corresponding to a 51% conversion.

Example II

Employing the procedure set forth in Example I, the same catalyst system was employed, except that the potassium salt of the $C_8$-telomer acid, $$CF_2Cl(CFClCF_2)_3COOH$$

was substituted for the perfluorooctanoic acid of Example I, in a similar amount of 0.75 gram. The polymerization tube was next charged with 2.1 grams of 2,3-dichlorohexafluorobutene-2 and 2.9 grams of 1,1-chlorofluoroethylene, which comprised a 20/80 molar ratio. The 2,3-dichlorohexafluorobutene-2 is prepared according to the procedure described by Henne and Trott, Journal of the American Chemical Society, volume 69, page 1820 (1947).

The polymerization reaction was carried out at a temperature of 50° C. for a period of 24 hours. The resultant rubbery copolymeric product was worked-up in accordance with the same procedure as set forth in Example I. This rubbery product, upon analysis, was found to comprise approximate 6.5 mole percent 2,3-dichlorohexafluorobutene-2, and the remaining major constituent, 1,1-chlorofluoroethylene, being present in an amount of approximately 93.5 mole percent. The copolymer was obtained in an amount corresponding to a 69% conver-

Example III

Employing the procedure set forth in Example I and the same polymerization system, the tube was charged with 3.05 grams of 4,4-dichlorohexafluorobutene-1 and 1.95 grams of vinyl chloride, which comprises a 30/70 molar ratio. The polymerization reaction was carried out at a temperature of 50° C. for a period of 16 hours. The resultant thermoplastic product was worked-up in accordance with the same procedure as set forth in Example I. This thermoplastic product was found, upon analysis, to comprise approximately 6 mole percent, 4,4-dichlorohexafluorobutene-1, and the remaining major constituent, vinyl chloride, being present in an amount of approximately 94 mole percent. The copolymer was obtained in an amount corresponding to a 40% conversion.

As previously indicated, the polymeric compositions of the present invention possess highly desirable physical and chemical properties which make them useful for fabrication of a wide variety of thermoplastic articles, or for the application to various surfaces as protective coatings. In such uses, a raw elastomeric copolymer, such as is produced in accordance with the procedure set forth in the above examples, is extruded or pressed into sheets at temperatures between about 250° F. and about 400° F. and at a pressure between about 500 and about 15,000 pounds per square inch for a period of about 5 to about 60 minutes. Thereafter, various articles can be molded from preforms cut from sheets and extruded stock in the form of gaskets, diaphragms, packings, etc. In this respect, it is preferred in such applications, that the raw copolymer also includes various vulcanizing agents and fillers.

When employed as protective coatings on any of the surfaces previously described, the raw copolymeric composition is dissolved in any of the aforementioned solvents and is applied to the desired surfaces, employing such apparatus as a knife-spreader or a doctor-blade or a reverse-roll coater. The solvent, after the copolymeric coating composition has been applied to the surface, is permitted to evaporate. This may also be accomplished in the presence of elevated temperatures, if so desired. In many applications, it is desirable to include in the copolymeric coating composition, various vulcanizing agents. In the latter case, supplementary heat-treatment of the coating is required, either during the solvent-removal step or thereafter. After the solvent has been completely evaporated, the coated surface is ready for use. In this respect, it should be noted that the polymeric coating composition may be applied to the surface either as a single coating or if so desired, the protective coating may be built-up by the application of several layers, each layer being permitted to harden by solvent evaporation before the next layer is applied. Furthermore, if so desired, the protective coatings, or the polymeric composition, when obtained in the form of sheets, may be suitably pigmented.

Other uses for the polymeric compositions of the present invention reside in the fabrication of belting hose, mountings, piston and pump-valves, sheet or valve disks, rolls, tubing, pressure-sensitive tape for electrical insulation purposes, grommets, or as adhesives for fastening a rubber surface to a metal or another rubber surface.

Since certain changes may be made in carrying out the process of the present invention in producing the desired polymeric compositions without departing from the scope of the invention, it is intended that all matter contained in the above description is to be interpreted as illustrative and not in a limiting sense.

I claim:

1. A process which comprises polymerizing a monomeric mixture of a dichlorohexafluorobutene selected from the group consisting of 2,3-dichlorohexafluorobutene-2 and 4,4-dichlorohexafluorobutene-1 and a monochloroethylene having not more than 1 fluorine atom as the only other halogen substituent, said mixture containing between about 5 mole percent and about 90 mole percent dichlorohexafluorobutene and the remaining major constituent being the monochloroethylene, at a temperature between about −20° C. and about 100° C. in the presence of a polymerization promoter selected from the group consisting of a water soluble peroxy promoter and an organic peroxy promoter.

2. A process which comprises polymerizing a monomeric mixture of a dichlorohexafluorobutene selected from the group consisting of 2,3-dichlorohexafluorobutene-2 and 4,4-dichlorohexafluorobutene-1 and a monochloroethylene having not more than 1 fluorine atom as the only other halogen substituent, said mixture containing between about 10 mole percent and about 60 mole percent dichlorohexafluorobutene and the remaining major constituent being the monochloroethylene, at a temperature between about −20° C. and about 100° C. in the presence of a polymerization promoter selected from the group consisting of a water soluble peroxy promoter and an organic peroxy promoter.

3. A process which comprises polymerizing a monomeric mixture of a dichlorohexafluorobutene selected from the group consisting of 2,3-dichlorohexafluorobutene-2 and 4,4-dichlorohexafluorobutene-1 and a monochloroethylene selected from the group consisting of 1,1-chlorofluoroethylene and vinyl chloride, said mixture containing between about 5 mole percent and about 50 mole percent dichlorohexafluorobutene and the remaining major constituent being the monochloroethylene, at a temperature between about −20° C. and about 100° C. in the presence of a polymerization promoter selected from the group consisting of a water soluble peroxy promoter and an organic peroxy promoter.

4. A process which comprises polymerizing a monomeric mixture of a dichlorohexafluorobutene selected from the group consisting of 2,3-dichlorohexafluorobutene-2 and 4,4-dichlorohexafluorobutene-1 and a monochloroethylene selected from the group consisting of 1,1-chlorofluoroethylene and vinyl chloride, said mixture containing between about 10 mole percent and about 60 mole percent dichlorohexafluorobutene and the remaining major constituent being the monochloroethylene, at a temperature between about −20° C. and about 100° C. in the presence of a polymerization promoter selected from the group consisting of a water soluble peroxy promoter and an organic peroxy promoter.

5. A process which comprises polymerizing a monomeric mixture of a dichlorohexafluorobutene selected from the group consisting of 2,3-dichlorohexafluorobutene-2 and 4,4-dichlorohexafluorobutene-1 and 1,1-chlorofluoroethylene, said mixture containing between about 5 mole percent and about 90 mole percent dichlorohexafluorobutene and the remaining major constituent being 1,1-chlorofluoroethylene, at a temperature between about −20° C. and about 100° C. in the presence of a polymerization promoter selected from the group consisting of a water soluble peroxy promoter and an organic peroxy promoter.

6. A process which comprises polymerizing a monomeric mixture of a dichlorohexafluorobutene selected from the group consisting of 2,3-dichlorohexafluorobutene-2 and 4,4-dichlorohexafluorobutene-1 and 1,1-chlorofluoroethylene, said mixture containing between about 10 mole percent and about 60 mole percent dichlorohexafluorobutene and the remaining major constituent being 1,1-chlorofluoroethylene, at a temperature between about −20° C. and about 100° C. in the presence of a polymerization promoter selected from the group consisting of a water soluble peroxy promoter and an organic peroxy promoter.

7. A process which comprises polymerizing a monomeric mixture of a dichlorohexafluorobutene selected from the group consisting of 2,3-dichlorohexafluorobutene-2 and 4,4-dichlorohexafluorobutene-1 and vinyl chloride, said mixture containing between about 5 mole percent and about 90 mole percent dichlorohexafluorobutene and the remaining major constituent being vinyl chloride, at a temperature between about —20° C. and about 100° C. in the presence of a polymerization promoter selected from the group consisting of a water soluble peroxy promoter and an organic peroxy promoter.

8. A process which comprises polymerizing a monomeric mixture of a dichlorohexafluorobutene selected from the group consisting of 2,3-dichlorohexafluorobutene-2 and 4,4-dichlorohexafluorobutene-1 and vinyl chloride, said mixture containing between about 10 mole percent and about 60 mole percent dichlorohexafluorobutene and the remaining major constituent being vinyl chloride, at a temperature between about —20° C. and about 100° C. in the presence of a polymerization promoter selected from the group consisting of a water soluble peroxy promoter and an organic peroxy promoter.

9. A copolymer of about 1 mole percent to about 50 mole percent of a dichlorohexafluorobutene selected from the group consisting of 2,3-dichlorohexafluorobutene-2 and 4,4-dichlorohexafluorobutene-1 and correspondingly about 99 mole percent to about 50 mole percent of a monochloroethylene having not more than 1 fluorine atom as the only other halogen substituent.

10. A copolymer of about 1 mole percent to about 50 mole percent of a dichlorohexafluorobutene selected from the group consisting of 2,3-dichlorohexafluorobutene-2 and 4,4-dichlorohexafluorobutene-1 and correspondingly about 99 mole percent to about 50 mole percent of a monochloroethylene selected from the group consisting of 1,1-chlorofluoroethylene and vinyl chloride.

11. A copolymer of about 5 mole percent to about 30 mole percent of a dichlorohexafluorobutene selected from the group consisting of 2,3-dichlorohexafluorobutene-2 and 4,4-dichlorohexafluorobutene-1 and correspondingly about 95 mole percent to about 70 mole percent of a monochloroethylene having not more than 1 fluorine atom as the only other halogen substituent.

12. A copolymer of about 5 mole percent to about 30 mole percent of a dichlorohexafluorobutene selected from the group consisting of 2,3-dichlorohexafluorobutene-2 and 4,4-dichlorohexafluorobutene-1 and correspondingly about 95 mole percent to about 70 mole percent of a monochloroethylene selected from the group consisting of 1,1-chlorofluoroethylene and vinyl chloride.

13. A copolymer of about 1 mole percent to about 50 mole percent of a dichlorohexafluorobutene selected from the group consisting of 2,3-dichlorohexafluorobutene-2 and 4,4-dichlorohexafluorobutene-1 and correspondingly about 99 mole percent to about 50 mole percent of 1,1-chlorofluoroethylene.

14. A copolymer of about 5 mole percent to about 30 mole percent of a dichlorohexafluorobutene selected from the group consisting of 2,3-dichlorohexafluorobutene-2 and 4,4-dichlorohexafluorobutene-1 and correspondingly about 95 mole percent to about 70 mole percent of 1,1-chlorofluoroethylene.

15. A copolymer of about 1 mole percent to about 50 mole percent of a dichlorohexafluorobutene selected from the group consisting of 2,3-dichlorohexafluorobutene-2 and 4,4-dichlorohexafluorobutene-1 and correspondingly about 99 mole percent to about 50 mole percent vinyl chloride.

16. A copolymer of about 5 mole percent to about 30 mole percent of a dichlorohexafluorobutene selected from the group consisting of 2,3-dichlorohexafluorobutene-2 and 4,4-dichlorohexafluorobutene-1 and correspondingly about 95 mole percent to about 70 mole percent vinyl chloride.

17. A copolymer of about 1 mole percent to about 50 mole percent of 4,4-dichlorohexafluorobutene-1 and correspondingly about 99 mole percent to about 50 mole percent of 1,1-chlorofluoroethylene.

18. A copolymer of about 1 mole percent to about 50 mole percent of 4,4-dichlorohexafluorobutene-1 and correspondingly about 99 mole percent to about 50 mole percent of vinyl chloride.

19. A process which comprises polymerizing in an emulsion system a monomeric mixture of a dichlorohexafluorobutene selected from the group consisting of 2,3-dichlorohexafluorobutene-2 and 4,4-dichlorohexafluorobutene-1, and a monochloroethylene having not more than 1 fluorine atom as the only other halogen substituent, said mixture containing between about 5 mole percent and about 90 mole percent dichlorohexafluorobutene and the remaining major constituent being the monochloroethylene, at a pH of about 7 and a temperature between about 5° C. and about 100° C. in the presence of a polymerization promoter selected from the group consisting of a water soluble peroxy promoter and an organic peroxy promoter.

References Cited in the file of this patent

UNITED STATES PATENTS

| 2,479,367 | Joyce et al. | Aug. 16, 1949 |
| 2,705,706 | Dittman et al. | Apr. 5, 1956 |

FOREIGN PATENTS

| 478,511 | Canada | Nov. 13, 1951 |
| 494,441 | Canada | July 14, 1953 |

UNITED STATES PATENT OFFICE

CERTIFICATE OF CORRECTION

Patent No. 2,893,983                                         July 7, 1959

Elizabeth S. Lo

It is hereby certified that error appears in the printed specification of the above numbered patent requiring correction and that the said Letters Patent should read as corrected below.

Column 3, line 32, for "ar preferably" read -- are preferably --; same column 3, line 63, for the formula reading "$(CF_2ClFCl_2)$" read -- $(CF_2ClCFCl_2)$ --.

Signed and sealed this 17th day of November 1959.

(SEAL)
Attest:

KARL H. AXLINE                                            ROBERT C. WATSON
Attesting Officer                                         Commissioner of Patents